United States Patent
Dawson et al.

(10) Patent No.: US 9,929,913 B2
(45) Date of Patent: Mar. 27, 2018

(54) AUTOMATIC FINDING AND SHARING OF IOT CONNECTED DEVICES

(71) Applicant: International Business Machines Corporation, Armonk, NY (US)

(72) Inventors: Christopher J. Dawson, Arlington, VA (US); Eli M. Dow, Wappingers Falls, NY (US); Rick A. Hamilton, II, Charlottesville, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 15/082,009

(22) Filed: Mar. 28, 2016

(65) Prior Publication Data

US 2017/0279682 A1    Sep. 28, 2017

(51) Int. Cl.
*H04L 12/26*    (2006.01)
*H04L 12/24*    (2006.01)
*H04L 29/08*    (2006.01)

(52) U.S. Cl.
CPC .......... *H04L 41/0893* (2013.01); *H04L 67/12* (2013.01); *H04L 67/141* (2013.01); *H04L 67/303* (2013.01)

(58) Field of Classification Search
USPC ................................. 709/223, 203, 224, 250
See application file for complete search history.

(56) References Cited

U.S. PATENT DOCUMENTS

| | | | |
|---|---|---|---|
| 8,271,365 B2* | 9/2012 | Jung | G06Q 30/02 705/35 |
| 2006/0267731 A1 | 11/2006 | Chen | |
| 2013/0203337 A1 | 8/2013 | Ling et al. | |
| 2015/0261863 A1 | 9/2015 | Dey et al. | |
| 2016/0092469 A1* | 3/2016 | Mukherjee | G06F 17/30241 705/325 |
| 2017/0149928 A1* | 5/2017 | George | H04L 67/306 |

FOREIGN PATENT DOCUMENTS

WO        2013072925 A3    5/2013

OTHER PUBLICATIONS

"Axeda Machine Cloud", PTC, <http://www.ptc.com/axeda>, printed Dec. 15, 2015, 4 pages.
"Best Realtime Apps Powered by Global Data Stream Network", PubNub, © 2010-2016 PubNub, Inc., <https://www.pubnub.com/>, printed Jan. 4, 2016, 6 pages.
"dweet.io—Share your thing—like it ain't no thang.", <http://dweet.io/>, printed Dec. 15, 2015, 8 pages.
"Recipes—IoT Foundation", IBM developerWorks, <https://developer.ibm.com/iotfoundation/>, printed Jan. 4, 2016, 2 pages.
Mell et al., "The NIST Definition of Cloud Computing", NIST, National Institute of Standards and Technology, U.S. Department of Commerce, Special Publication 800-145, Sep. 2011, 7 pages.

* cited by examiner

*Primary Examiner* — Jude Jean Gilles
(74) *Attorney, Agent, or Firm* — Gilbert Harmon

(57) ABSTRACT

Methods, computer program products, and systems are presented. Data characteristics describing data from IoT devices are identified. Data profiles representing the IoT devices are generated. The data profiles are grouped into data profile groupings based on one or more of analytics and machine learning. A mapping of the data profile groupings to virtual servers is determined.

20 Claims, 6 Drawing Sheets

US 9,929,913 B2

AUTOMATIC FINDING AND SHARING OF IOT CONNECTED DEVICES

TECHNICAL FIELD OF THE INVENTION

The present disclosure relates generally to the Internet of Things (IoT), and more particularly to sharing of IoT devices.

BACKGROUND OF THE INVENTION

With the growth of IoT, IoT devices can connect with enterprise applications via cloud infrastructure.

Conventional technology allows for "real-time analysis [of] sensor data captured from virtually any kind of sensor device and facilitate[ion of] sensor-data capture, storage and analytics thereof using a suite of services therefrom said platform" and "leverag[ing] a cloud computing platform offering a suite of services designed for real-time sensor data analytics, data mining, machine learning, image and video analysis, location based services and context-aware services in a ubiquitous computing environment" (WO 2013072925 A2, "A computing platform for development and deployment of sensor data based applications and services").

According to conventional methods, possibilities for sharing and reuse of IoT devices through the use of an accessible cloud service are limited by one or more of the following potential problems and/or potential areas for improvement: (i) it is not easy to map the requirements of an enterprise application to available IoT devices; (ii) an enterprise application can require an IoT device that is not dedicated to (or even owned by) that application; and/or (iii) IoT device functionality is subject to waste or duplication.

SUMMARY

The shortcomings of the conventional technology are overcome, and additional advantages are provided, through the provision of methods, computer program products, and/or computer systems. Data characteristics describing data from IoT devices are identified. Data profiles representing the IoT devices are generated. The data profiles are grouped into data profile groupings based on one or more of analytics and machine learning. A mapping of the data profile groupings to virtual servers is determined. Accordingly, requirements of enterprise applications can be mapped to available IoT devices.

In an embodiment, an IoT device is connected to a landing server for temporary housing. Accordingly, data characteristics of the IoT device can be determined before an appropriate destination server is identified.

In an embodiment, a ranking of the IoT devices is determined based on data characteristics concerning past performance. Accordingly, historically reliable IoT devices can be prioritized.

In an embodiment, conditions on one or more virtual servers are assessed. A mismatch of an IoT device with a virtual server is determined. It is determined that the IoT device should be moved to a landing server for temporary housing. The IoT device is connected to the landing server. Accordingly, the IoT device can be temporarily housed pending determination of an appropriate workload adjustment.

In an embodiment, a request to connect with an IoT device is received from a user. An available IoT device is identified. Information is communicated to the user concerning the available IoT device. Accordingly, the user can receive information relevant to selecting an IoT device that meets its requirements.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings, in which:

DETAILED DESCRIPTION

Figure 1:
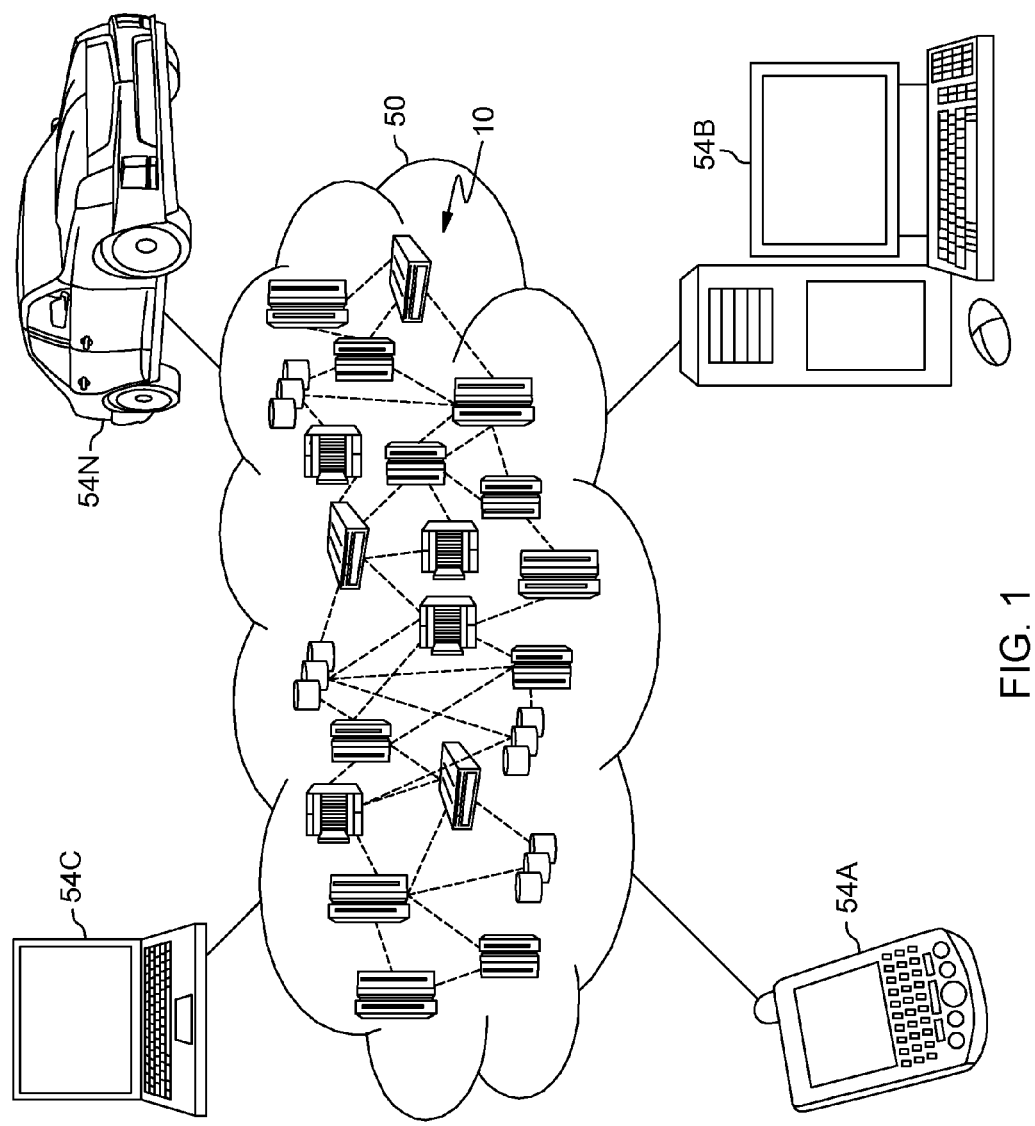
FIG. 1 depicts a cloud computing environment, in accordance with an embodiment of the present invention.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to obscure the disclosure in detail unnecessarily. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts, will be apparent to those skilled in the art from this disclosure.

Recognizing that conventional technology does not specifically address the sharing and reuse of IoT devices through an accessible cloud service, the present disclosure provides, in part, methods, computer program products, and computer systems for IoT device sharing.

Advantageously, techniques disclosed herein allow for more useful sharing and advertising of various IoT devices, such as but not limited to cameras, devices for monitoring processing power, and devices for monitoring weather. Techniques disclosed herein can facilitate sharing and advertising of IoT devices by leveraging analytics and machine learning to group IoT devices based on their requirement profiles and data characteristics. Techniques disclosed herein can further facilitate sharing and advertising of IoT devices and mapping IoT device groupings to virtual servers based on their data processing and handling requirements.

Reference is made herein to the drawings, which are not drawn to scale for ease of understanding, wherein the same reference numbers used throughout different figures designate the same or similar concepts.

FIGS. 1-6 depict various aspects of computing, including cloud computing, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
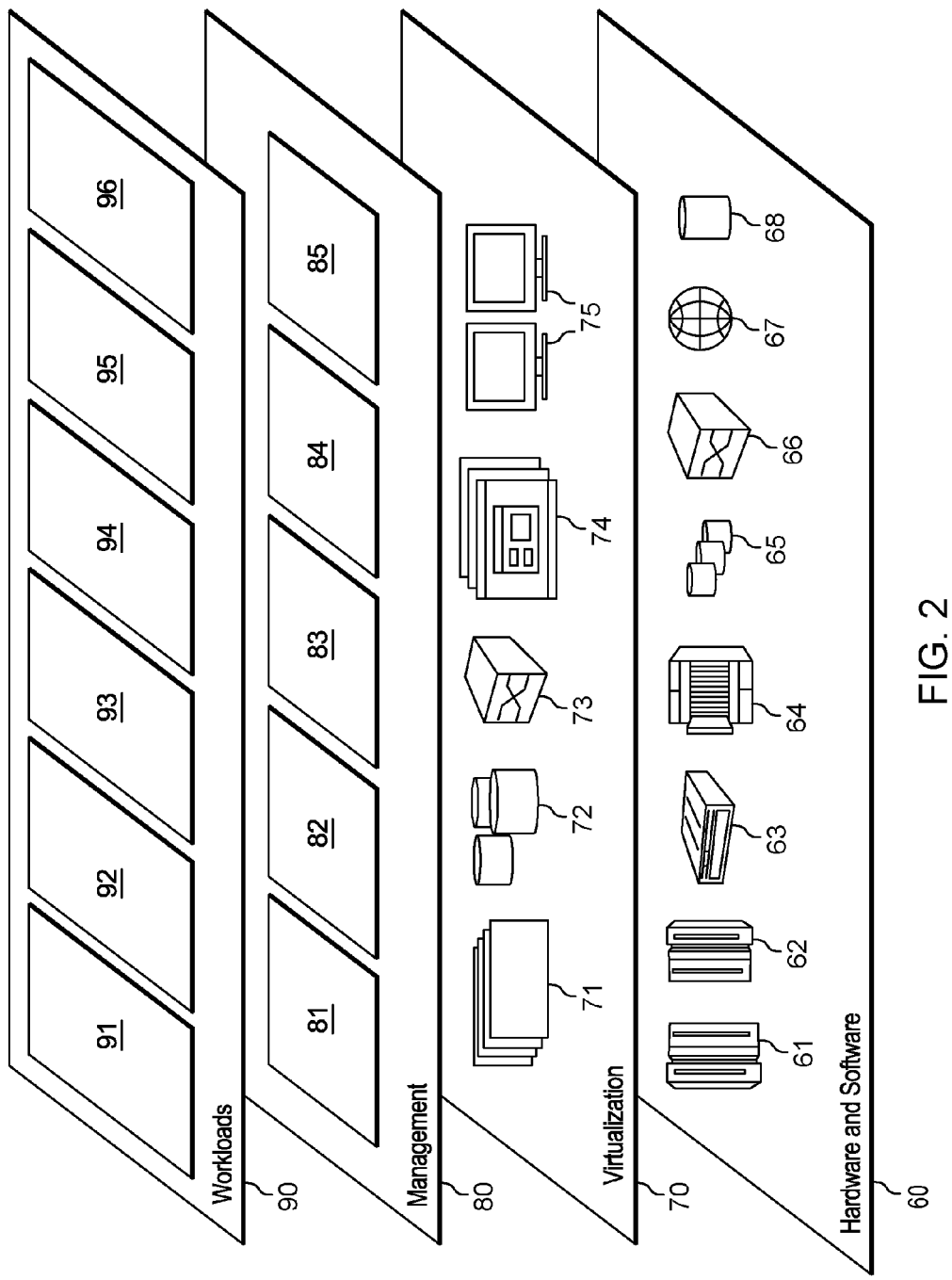
FIG. 2 depicts abstraction model layers, in accordance with an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IoT device sharing 96.

Figure 3:
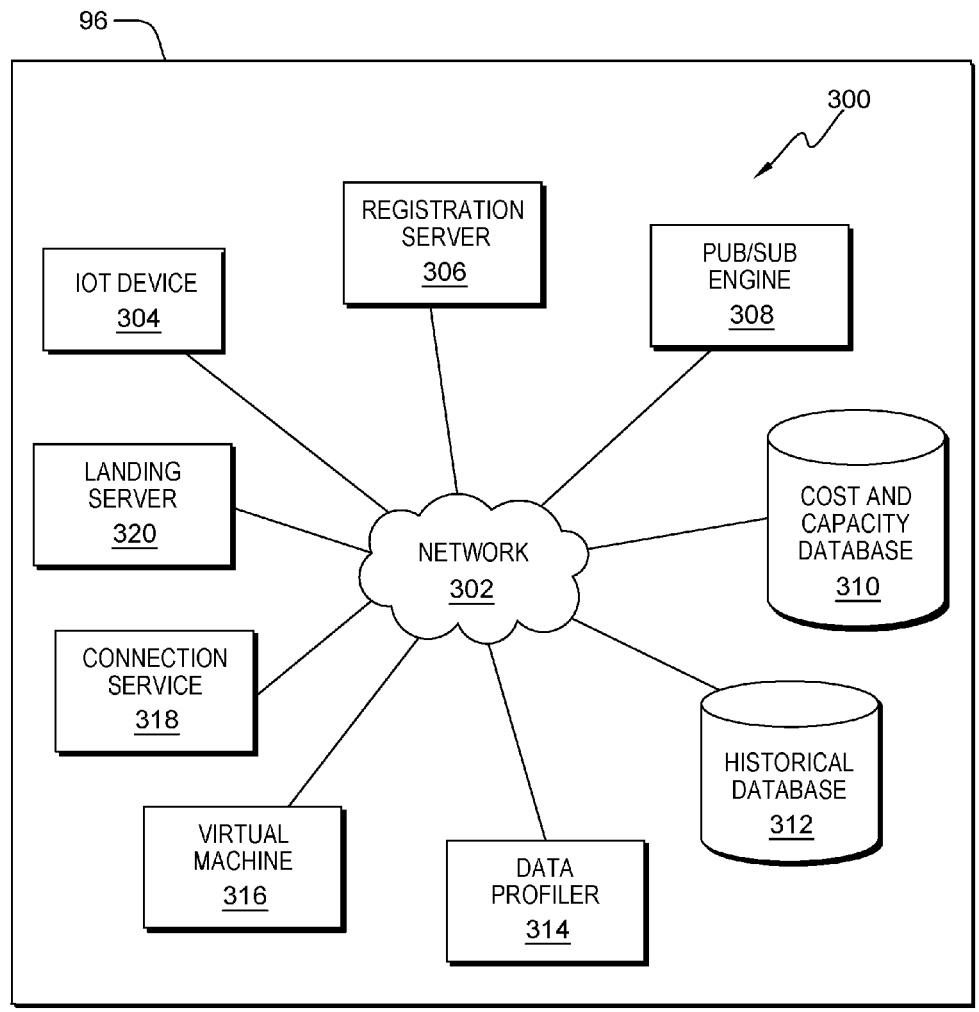
FIG. 3 is a block diagram of a computing system for IoT device sharing, in accordance with an embodiment of the present invention.

FIG. 3 shows a block diagram of computing environment 300, in accordance with an embodiment of the present invention. FIG. 3 is provided for the purposes of illustration and does not imply any limitations with regard to the environments in which different embodiments can be implemented. Many modifications to the depicted environment can be made by those skilled in the art without departing from the scope of the invention as recited in the claims.

Computing environment 300 includes IoT device 304, registration server 306, publish/subscribe (pub/sub) engine 308, cost and capacity database 310, historical database 312, data profiler 314, virtual machine 316, connection service 318, and landing server 320, which can be interconnected with one another and other devices (not shown) over network 302.

Network 302 can be, for example, a telecommunications network, a local area network (LAN), a wide area network (WAN), such as the Internet, or a combination of these, and can include wired, wireless, or fiber optic connections. In general, network 302 can be any combination of connections and protocols that will support communications between computing devices within computing environment 300, in accordance with an embodiment of the present invention.

IoT device 304 represents a variable number of IoT-connected devices, in accordance with an embodiment of the present invention. The number of instances of IoT device 304 represented in FIG. 3 is not intended to be limiting. IoT device 304 can be, for example but without limitation, a camera, a thermometer, a device for monitoring processing power, or a device for monitoring weather conditions.

In an embodiment, IoT device 304 can be location aware and advertise a service (e.g., weather monitoring) in a specific location. For example, IoT device 304 can be a device located in Phoenix, Ariz. that measures temperature as part of a shared "temperature service." In the same example, IoT device 304 can be connected across network 302 with an end user (not shown), such as an application located in New York City that requires temperature information from Phoenix.

New instances of IoT device 304 can be registered with registration server 306. A user registering an IoT device 304 can provide information to be stored in cost and capacity database 310 and/or historical database 312 (each described herein), for example at the time of registration.

In addition to handling device registrations, registration server 306 can receive end user registration information, for example but without limitation, information regarding the type(s) of data to which the end user would like to subscribe, and can serve as a front end port through which the end user makes requests regarding the availability of IoT device 304.

In various embodiments, the end user can search for, subscribe to, and/or connect with IoT device 304 via registration server 306. For example, if IoT device 304 is a weather station located in New York City, a person or a system requiring weather information from New York City can request the availability of IoT device 304 via registration server 306.

Pub/sub engine 308 is responsible for mapping end user subscriptions to IoT device 304, determining end user access to IoT device 304, and/or allowing the end user to subscribe to particular messages from IoT device 304.

Pub/sub engine 308 can communicate with registration server 306 to identify instances of IoT device 304 that are available for use. Pub/sub engine 308 can receive registration information regarding IoT device 304, such as but not limited to available capacity, function, and shareable functionality and/or data. In a non-limiting example, pub/sub engine 308 can receive information regarding IoT device 304 indicating that IoT device 304 offers compute capacity from the hours of 2:00 AM to 6:00 PM every Thursday and is located in the New York City Area.

Pub/sub engine 308 can include a mechanism to store access and usage information such that an end user requesting service can access IoT device 304. In a non-limiting example, an end user wishes to subscribe to a weather service that tracks the temperature in his or her current geographical location once every 5 minutes. If a first instance of IoT device 304 and a second instance of IoT device 304 both provide temperature readings in the end user's geographical location, but the first instance of IoT device 304 publishes readings once every 5 minutes, and the second instance of IoT device 304 publishes readings once every hour, pub/sub engine 308 can identify that only the first instance of IoT device 304 satisfies the end user's requirements and list only that device as available for subscription.

Cost and capacity database 310 comprises information about the available capacity of IoT device 304; the cost, if any, of accessing IoT device 304; and/or information regarding available virtual machines, e.g., virtual machine 316 (described herein), such as but without limitation capacity, memory, disk, performance, and cost information for a virtual machine 316. In an embodiment, cost and capacity database 310 can receive requests via registration server 306 pursuant to a request from an end user for access to IoT device 304.

Historical database 312 comprises information about past performance, value, and/or availability of IoT device 304 (also referred to herein as "data characteristics," the basis for a "data profile," described herein). Data characteristics can include, for example but without limitation, characterization as commercial data or residential data; volume of data generated (e.g., number of messages per minute, or megabits per second, mbps); whether IoT device 304 generates data at fixed time intervals or only pursuant to a defined data change; frequency of data change; safety concerns or potential impact when data exceeds a threshold value, e.g., if a change in temperature could trigger a gas explosion; number of subscribers; whether the data requires further processing (e.g., aggregation, transformation from one format to another, filtering, encryption) or consumes other services; geographical information regarding the source of the data; and/or accuracy in the past.

In a non-limiting example, a first instance of IoT device 304 comprises sensors associated with an oil rig, and a second instance of IoT device 304 comprises residential sensors (e.g., associated with household appliances) connected across network 302 with a service provider (not shown). In the same example, data characteristics associated with the first instance of IoT device 304 include a higher rate of messages per minute; more frequent data changes; and/or requirement of further analysis for detection of anomalies, e.g., temperature anomalies or slowing of oil flow rate, as compared with the data characteristics associated with the second instance of IoT device 304.

In an embodiment, data characteristics can be gathered pursuant to a service-level agreement between a customer and a service provider. For example, the service provider can request that the customer identify data characteristics when IoT device 304 is registered with registration server 306.

In an embodiment, the service provider can provide a monitoring module (not shown) associated with IoT device 304 to collect data characteristics over a predefined period of time. For example, the service provider can analyze the inputs, outputs, and/or frequency of IoT device 304 to derive data characteristics of IoT device 304.

Data profiler 314 is responsible for developing a data profile for IoT device 304 based on the data characteristics of IoT device 304. Data profiler 314 can classify and group instances of IoT device 304 based on, for example but without limitation, type of service and/or data provided.

Figure 4:
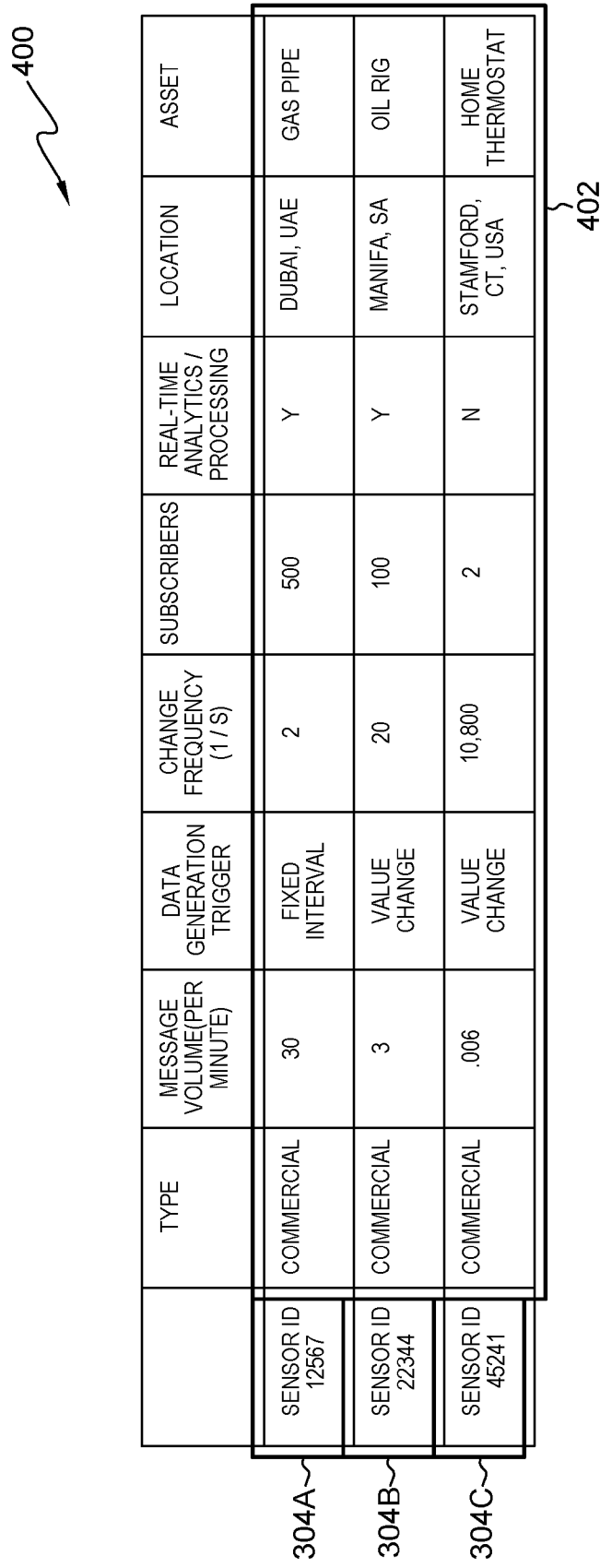
FIG. 4 is a table of exemplary historical data associated with IoT devices, in accordance with an embodiment of the present invention.

In an embodiment, data profiler 314 can leverage analytics and/or machine learning to group instances of IoT device 304 dynamically based on identifying common characteristics that comprise their respective data profiles, as further illustrated herein with reference to FIG. 4.

Data profiler 314 can also determine a mapping of profile groupings to a virtual machine 316. Connection service 318 is responsible for connecting a profile grouping (e.g., comprising IoT device 304) to a virtual machine 316 based on the mapping determined by data profiler 314.

In an embodiment, data profiler 314 can also use data characteristics to prioritize instances of IoT device 304 based on past performance, value, and/or availability. For example, data profiler 314 can access historical database 312 in order to prioritize, for the purpose of presentation to an end user, a particular instance of IoT device 304 that has performed reliably in the past.

Landing server 320 is a staging server for new instances of IoT device 304. In an embodiment, if registration server 306 does not receive data characteristics of IoT device 304 at registration, landing server 320 can temporarily house IoT device 304 while data characteristics of IoT device 304 are determined. For example, a cloud service provider can monitor IoT device 304 for a period of time, during which IoT device 304 is housed by landing server 320, and gather data characteristics of IoT device 304.

In an embodiment, new instances of IoT device 304 can connect to landing server 320 on a first-come, first-served basis.

Data profiler 314 can use the data characteristics gathered while IoT device 304 is housed on landing server 320 to map IoT device 304 to an appropriate virtual machine 316. In an embodiment, data profiler 314 can periodically compare the data profile of IoT device 304 to data profiles of other devices (not shown) connected to virtual machine 316, and map IoT device 304 to virtual machine 316 based on the comparison.

Landing server 320 can also temporarily house instances of IoT device 304 that were previously mismatched to a virtual machine 316. For example, a first instance of IoT device 304 can be a home refrigerator sensor (i.e., a residential sensor) that is connected to the same instance of virtual machine 316 as a second instance of IoT device 304, which is a sensor owned by a gas company (i.e., a utility sensor). In the same example, after a period of data monitoring, the first instance of IoT device 304 is determined to have a different data profile than the second instance of IoT device 304. The first instance of IoT device 304 can remain on the same connection if no new instance of IoT device 304 comes onboard; however, if a third instance of IoT device 304, a utility sensor, comes onboard, the first instance of IoT device 304 can be moved to a different instance of virtual machine 316 and give its previous slot to the third instance of IoT device 304. If a different (i.e., destination) instance of virtual machine 316 is not immediately determined for the first instance of IoT device 304, then the first instance of IoT device 304 can be temporarily housed by landing server 320.

FIG. 4 is a table 400 showing exemplary data characteristics, in accordance with an embodiment of the present invention. Table 400 shows data characteristics 402 for IoT device 304A (represented as SensorID 12567), which is a commercial device associated with a gas pipe; IoT device 304B (represented as SensorID 22344), which is a commercial device associated with an oil rig; and IoT device 304C (represented as SensorID 45241), which is a residential device associated with a home thermostat. Data profiler 314 can leverage analytics and/or machine learning to group IoT devices 304A-C based on data characteristics 402.

For example, data profiler 314 can generate the following groupings:

Group 1: commercial data, high volume, high change rate, large number of subscribers, require analytics (comprising IoT device 304A);

Group 2: commercial data, medium volume, medium change rate, medium number of subscribers, require analytics (comprising IoT device 304B); and Group 3: residential data, low volume, low change rate, small number of subscribers, no analytics (comprising IoT device 304C).

Figure 5:
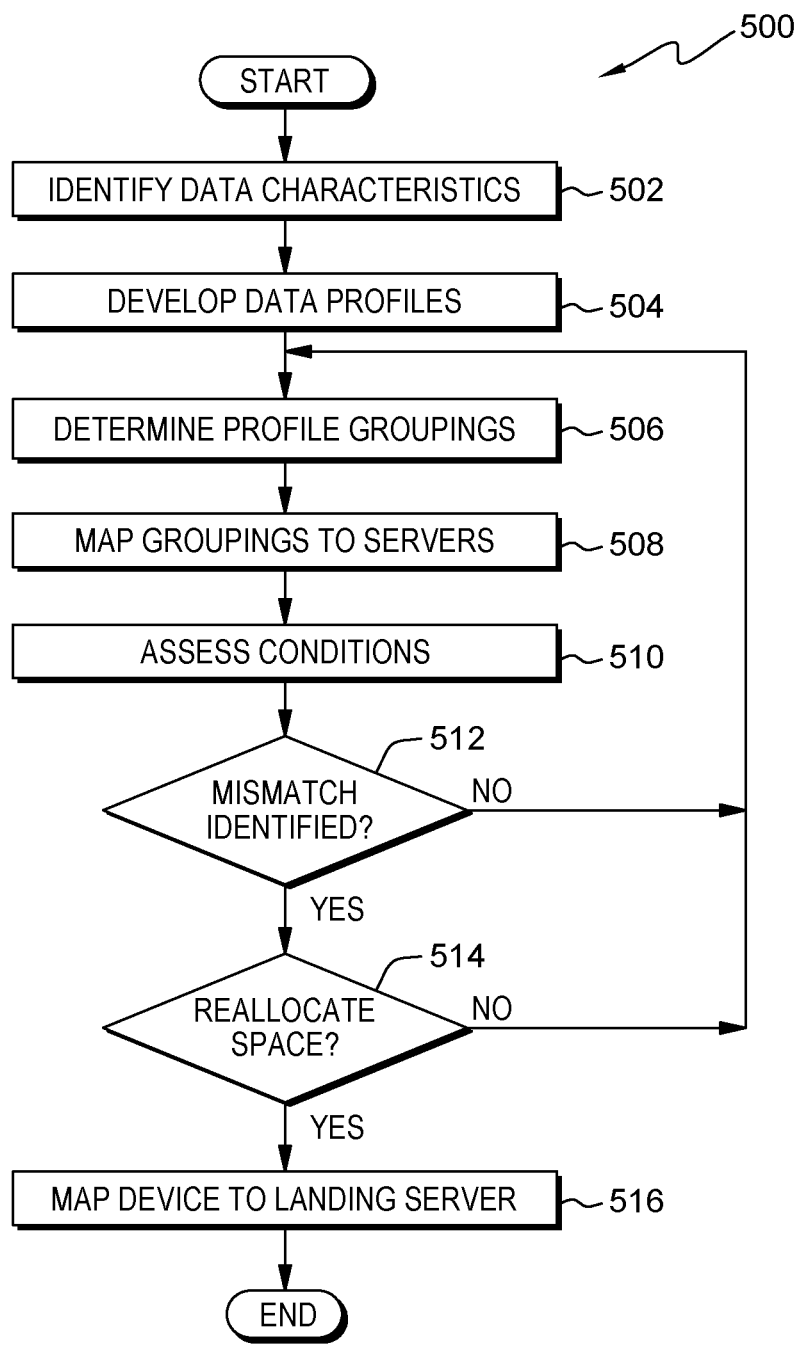
FIG. 5 is a flowchart depicting steps of an IoT device sharing method, in accordance with an embodiment of the present invention.

FIG. 5 is a flowchart 500 depicting steps of an IoT device sharing method, in accordance with an embodiment of the present invention.

In step 502, data profiler 314 identifies data characteristics for IoT device 304. For example, the data profiler 314 identifies data characteristics that a user previously provided to registration server 306 when registering IoT device 304.

In step 504, data profiler 314 develops a data profile for IoT device 304 based on the data characteristics.

In step 506, data profiler 314 determines one or more profile groupings based on analytics and/or machine learning.

In step 508, data profiler 314 determines a mapping of one or more profile groupings determined in step 506 to one or more instances of virtual machine 316. For example, data profiler 314 determines a mapping of a profile grouping comprising IoT device 304 to virtual machine 316 and sends an instruction to connection service 318 to connect IoT device 304 to virtual machine 316 based on the mapping.

In step 510, data profiler 314 assesses current conditions on one or more instances of virtual machine 316.

In step 512, data profiler 314 checks for a mismatch of an IoT device 304 with a virtual machine 316.

In step 514 (YES branch, step 512), responsive to identifying a mismatch of a first instance of IoT device 304 with virtual machine 316, data profiler 314 determines whether the spot occupied by the first instance of IoT device 304 on virtual machine 316 should be given to a second instance of IoT device 304 that is housed on landing server 320. For example, data profiler 314 compares the data profile of the second instance of IoT device 304 with the data profile of other devices (not shown) housed on virtual machine 316.

If data profiler 314 does not identify a mismatch of an IoT device 304 with virtual machine 316 (NO branch, step 512), processing returns to step 506.

In step 516 (YES branch, step 514), responsive to determining that the spot occupied by the first instance of IoT device 304 on virtual machine 316 should be given to the second instance of IoT device 304 that is housed on landing server 320, data profiler 314 maps the first instance of IoT device 304 to landing server 320. For example, data profiler 314 sends an instruction to connection service 318 to connect the first instance of IoT device 304 to landing server 320.

If data profiler 314 does not determine that the spot occupied by the first instance of IoT device 304 on virtual machine 316 should be given to the second instance of IoT device 304 that is housed on landing server 320 (NO branch, step 514), processing returns to step 506.

Figure 6:
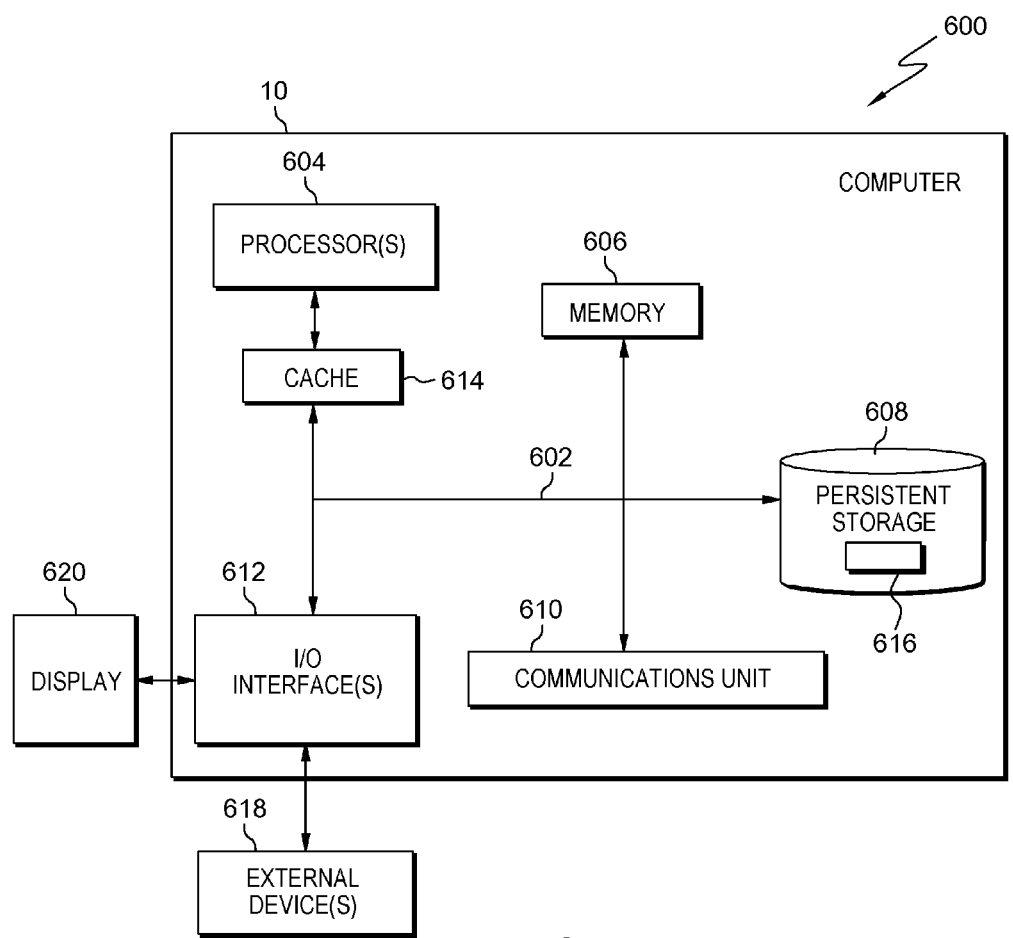
FIG. 6 is a block diagram of components of a computing device executing steps of an IoT device sharing program, in accordance with an embodiment of the present invention.

FIG. 6 depicts a block diagram 600 of components of a computer, such as computing node 10 in FIG. 1, in accordance with illustrative embodiments of the present invention. It should be appreciated that FIG. 6 provides only an illustration of one implementation and does not imply any limitations with regard to the environments in which different embodiments may be implemented. Many modifications to the depicted environment may be made.

Block diagram 600 shows communications fabric 602, which provides communications between computer processor(s) 604, memory 606, persistent storage 608, communications unit 610, and input/output (I/O) interface(s) 612, and cache 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) and cache memory 614. In general, memory 606 can include any suitable volatile or non-volatile computer readable storage media. Cache 614 is a fast memory that enhances the performance of computer processor(s) 604 by holding recently accessed data, and data near accessed data, from memory 606.

Program instructions and data used to practice embodiments of the invention, referred to collectively as component(s) 616, are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive can be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. Communications unit 610 can include one or more network interface cards. Communications unit 610 can provide communications through the use of either or both physical and wireless communications links. Component(s) 616 can be downloaded to persistent storage 608 through communications unit 610.

I/O interface(s) 612 allows for input and output of data with other devices that may be connected to computing device 304. For example, I/O interface 612 can provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., component(s) 616, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a touchscreen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for IoT device sharing, the method comprising:
 identifying, by one or more computer processors, data characteristics describing data from IoT devices;
 generating, by one or more computer processors, data profiles representing the IoT devices;

grouping, by one or more computer processors, the data profiles into data profile groupings based on one or more of analytics and machine learning; and determining, by one or more computer processors, a mapping of the data profile groupings to virtual servers.

2. The computer-implemented method of claim 1, wherein data characteristics comprise one or more of commercial nature, residential nature, communication volume, fixed interval trigger, change-based trigger, frequency of change, safety concerns, number of subscribers, processing requirement, location, past accuracy, and past performance.

3. The computer-implemented method of claim 1, further comprising:

connecting, by one or more computer processors, an IoT device to a landing server for temporary housing pending an initial identification of data characteristics.

4. The computer-implemented method of claim 2, further comprising:

determining, by one or more computer processors, a ranking of the IoT devices based on data characteristics concerning past performance.

5. The computer-implemented method of claim 1, further comprising:

assessing, by one or more computer processors, conditions on one or more virtual servers;

determining, by one or more computer processors, a mismatch of an IoT device with a virtual server;

determining, by one or more computer processors, that the IoT device should be moved to a landing server for temporary housing; and connecting, by one or more computer processors, the IoT device to the landing server.

6. The computer-implemented method of claim 1, further comprising:

receiving, by one or more computer processors, a request from a user to connect with an IoT device; and identifying, by one or more computer processors, an available IoT device; and communicating, by one or more computer processors, to the user information concerning the available IoT device.

7. The computer-implemented method of claim 6, wherein information concerning the available IoT device comprises one or more of cost information and capacity information.

8. A computer program product for IoT device sharing, the computer program product comprising:

one or more computer readable storage media and program instructions stored on the one or more computer readable storage media, the program instructions comprising:

program instructions to identify data characteristics describing data from IoT devices;

program instructions to generate data profiles representing the IoT devices;

program instructions to group the data profiles into data profile groupings based on one or more of analytics and machine learning; and program instructions to determine a mapping of the data profile groupings to virtual servers.

9. The computer program product of claim 8, wherein data characteristics comprise one or more of commercial nature, residential nature, communication volume, fixed interval trigger, change-based trigger, frequency of change, safety concerns, number of subscribers, processing requirement, location, past accuracy, and past performance.

10. The computer program product of claim 8, further comprising:

program instructions to connect an IoT device to a landing server for temporary housing pending an initial identification of data characteristics.

11. The computer program product of claim 8, further comprising:

program instructions to determine a ranking of the IoT devices based on data characteristics concerning past performance.

12. The computer program product of claim 8, further comprising:

program instructions to assess conditions on one or more virtual servers;

program instructions to determine a mismatch of an IoT device with a virtual server;

program instructions to determine that the IoT device should be moved to a landing server for temporary housing; and program instructions to connect the IoT device to the landing server.

13. The computer program product of claim 8, further comprising:

program instructions to receive a request from a user to connect with an IoT device; and program instructions to identify an available IoT device; and program instructions to communicate to the user information concerning the available IoT device.

14. The computer program product of claim 8, wherein information concerning the available IoT device comprises one or more of cost information and capacity information.

15. A computer system for IoT device sharing, the computer system comprising:

one or more processors;

one or more computer readable storage media; and program instructions stored on the one or more computer readable storage media for execution by at least one of the one or more processors, the program instructions comprising:

program instructions to identify data characteristics describing data from IoT devices;

program instructions to generate data profiles representing the IoT devices;

program instructions to group the data profiles into data profile groupings based on one or more of analytics and machine learning; and program instructions to determine a mapping of the data profile groupings to virtual servers.

16. The computer system of claim 15, wherein data characteristics comprise one or more of commercial nature, residential nature, communication volume, fixed interval trigger, change-based trigger, frequency of change, safety concerns, number of subscribers, processing requirement, location, past accuracy, and past performance.

17. The computer system of claim 15, further comprising:

program instructions to connect an IoT device to a landing server for temporary housing pending an initial identification of data characteristics.

18. The computer system of claim 15, further comprising:

program instructions to determine a ranking of the IoT devices based on data characteristics concerning past performance.

19. The computer system of claim 15, further comprising:

program instructions to assess conditions on one or more virtual servers;

program instructions to determine a mismatch of an IoT device with a virtual server;
program instructions to determine that the IoT device should be moved to a landing server for temporary housing; and
program instructions to connect the IoT device to the landing server.

20. The computer system of claim 15, further comprising:
program instructions to receive a request from a user to connect with an IoT device; and
program instructions to identify an available IoT device; and
program instructions to communicate to the user information concerning the available IoT device.

* * * * *